US009226332B2

(12) United States Patent
Hedayat (10) Patent No.: US 9,226,332 B2
(45) Date of Patent: Dec. 29, 2015

(54) HYBRID CONTENTION MECHANISM FOR WLANS

(71) Applicant: Cisco Technology, Inc., San Jose, CA (US)

(72) Inventor: Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 14/024,755

(22) Filed: Sep. 12, 2013

(65) Prior Publication Data

US 2015/0016435 A1    Jan. 15, 2015

Related U.S. Application Data

(60) Provisional application No. 61/844,572, filed on Jul. 10, 2013.

(51) Int. Cl.
*H04W 4/00* (2009.01)
*H04W 76/02* (2009.01)
*H04W 84/12* (2009.01)

(52) U.S. Cl.
CPC ............ *H04W 76/025* (2013.01); *H04W 84/12* (2013.01)

(58) Field of Classification Search
CPC ..................... H04W 76/025; H04W 84/12
See application file for complete search history.

(56) References Cited

U.S. PATENT DOCUMENTS

| 7,301,924 B1 | 11/2007 | Gurbuz et al. |
| 7,684,333 B1 | 3/2010 | Dasylva et al. |
| 2004/0196850 A1* | 10/2004 | Ho .............................. 370/395.4 |
| 2004/0253996 A1* | 12/2004 | Chen et al. ..................... 455/574 |
| 2014/0036876 A1* | 2/2014 | Li et al. .......................... 370/336 |
| 2014/0071873 A1* | 3/2014 | Wang et al. ................... 370/311 |
| 2015/0016435 A1* | 1/2015 | Hedayat ........................ 370/338 |

OTHER PUBLICATIONS

Dasylva, et al., "Class-based Contention Periods (CCP) for the 802.11n MAC," IEEE P802.11, Wireless LANs, Aug. 11, 2004, pp. 1-22.
Aust, et al., "IEEE 802.11ah: Advantages in Standards and Further Challenges for Sub 1 GHz Wi-Fi," 2012 IEEE International Conference on Communications (ICC), Jun. 10-15, 2012, pp. 6885-6889.

* cited by examiner

*Primary Examiner* — Robert Wilson
(74) *Attorney, Agent, or Firm* — Edell, Shapiro & Finnan, LLC (57) ABSTRACT

Techniques are presented herein for providing hybrid contention mechanisms for a wireless medium. A first wireless device (e.g., a wireless access point) that serves a plurality of second wireless devices (e.g., client devices) in a wireless network, groups the plurality of second wireless devices into sets based on commonality of the second wireless devices in terms of one or more of: power requirements and throughput requirements. A time interval on a wireless channel during which the second wireless devices may contend for usage of the wireless medium is partitioned into a plurality of disjoint or overlapping contention periods. Each set of second wireless devices is assigned to a corresponding one of the plurality of contention periods such that only second wireless devices in each set contend for access to the wireless channel during the corresponding contention period assigned to that set.

22 Claims, 6 Drawing Sheets

HYBRID CONTENTION MECHANISM FOR WLANS

CROSS-REFERENCE TO RELATED APPLICATION

This application claims priority to U.S. Provisional Patent Application No. 61/844,572, filed Jul. 10, 2013, the entirety of which is incorporated herein by reference.

TECHNICAL FIELD

The present disclosure relates to wireless communication systems, such as wireless local area networks (WLANs).

BACKGROUND

There are several challenges in current and future WLAN deployments that require revisiting some of the IEEE 802.11 Media Access Control (MAC) procedures. Increasing the number of stations (STAs) that are served by a single access point (AP) in current deployments calls for better MAC efficiency and scalability. APs need a more intelligent way to differentiate STAs (also referred to as "clients") in terms of client power consumption and/or other metrics. There are an increasing number of low-power devices that have more power-efficient operation requirements than the current IEEE 802.11 MAC procedures can offer.

DESCRIPTION OF EXAMPLE EMBODIMENTS

Overview

Techniques are presented herein for providing hybrid contention mechanisms for a wireless medium. A first wireless device (e.g., a wireless access point) that serves a plurality of second wireless devices (e.g., client devices) in a wireless network, groups the plurality of second wireless devices into sets based on commonality of the second wireless devices in terms of one or more of: power requirements and throughput requirements. A time interval on a wireless channel during which the second wireless devices may contend for usage of the wireless medium is partitioned into a plurality of disjoint or overlapping contention periods. Each set of second wireless devices is assigned to a corresponding one of the plurality of contention periods such that only second wireless devices in each set contend for access to the wireless channel during the corresponding contention period assigned to that set.

Example Embodiments

Future WLANs will include many more client devices with much more diversity (i.e., different types of clients) than current WLANs. Client devices will have diverse requirements in terms of power, expected duty cycle, throughput, etc. Examples of diverse types of clients include laptops, Smartphones, sensors, power meters, etc.

Diversity of the types of client devices impacts the role of the access point (AP) in ensuring various operational conditions in the WLAN. On the one hand, the AP needs to minimize collisions (simultaneous transmissions by different client devices) in high density (numerous client devices within a coverage area) environments. For example, a sensor is a low-power and low-throughput client device and it is preferred that it not be impacted by multiple collisions when another client is downloading video streams. On the other hand, the AP also needs to operate so as to maintain low power consumption for client devices that operate on battery power over extended periods of time, and to achieve lower and/or more deterministic channel access delay.

Techniques are presented herein to provide hybrid contention mechanisms in which a communication medium (e.g., wireless channel) is partitioned, by the AP, into several disjoint or overlapping contention periods (CPs). The number and length (duration) of the CPs can be changed dynamically by the AP based on history of activity of client devices. A set of clients with similar power requirements and/or throughput requirements are assigned to one or multiple CPs. Clients may go into a "sleep" mode except during their assigned CPs.

Example use cases for these techniques include home and enterprise WLANs that serve laptops, tablets, Smartphones, meters, sensors, and security cameras, etc. These techniques are also useful for machine-to-machine (M2M) communications and Internet-of-Things applications. M2M uses increase the number of clients in future WLANs significantly and add to the diversity of devices. In addition, an IEEE 802.11ah WLAN in a residential neighborhood is another use case, such as for "Smart Grid—Meter to Pole" applications where a large number of STAs (up to 6000) need to be supported by one AP. Still other use cases include existing higher-rate devices with sensors and meters, and cellular data off-load.

Figure 1:
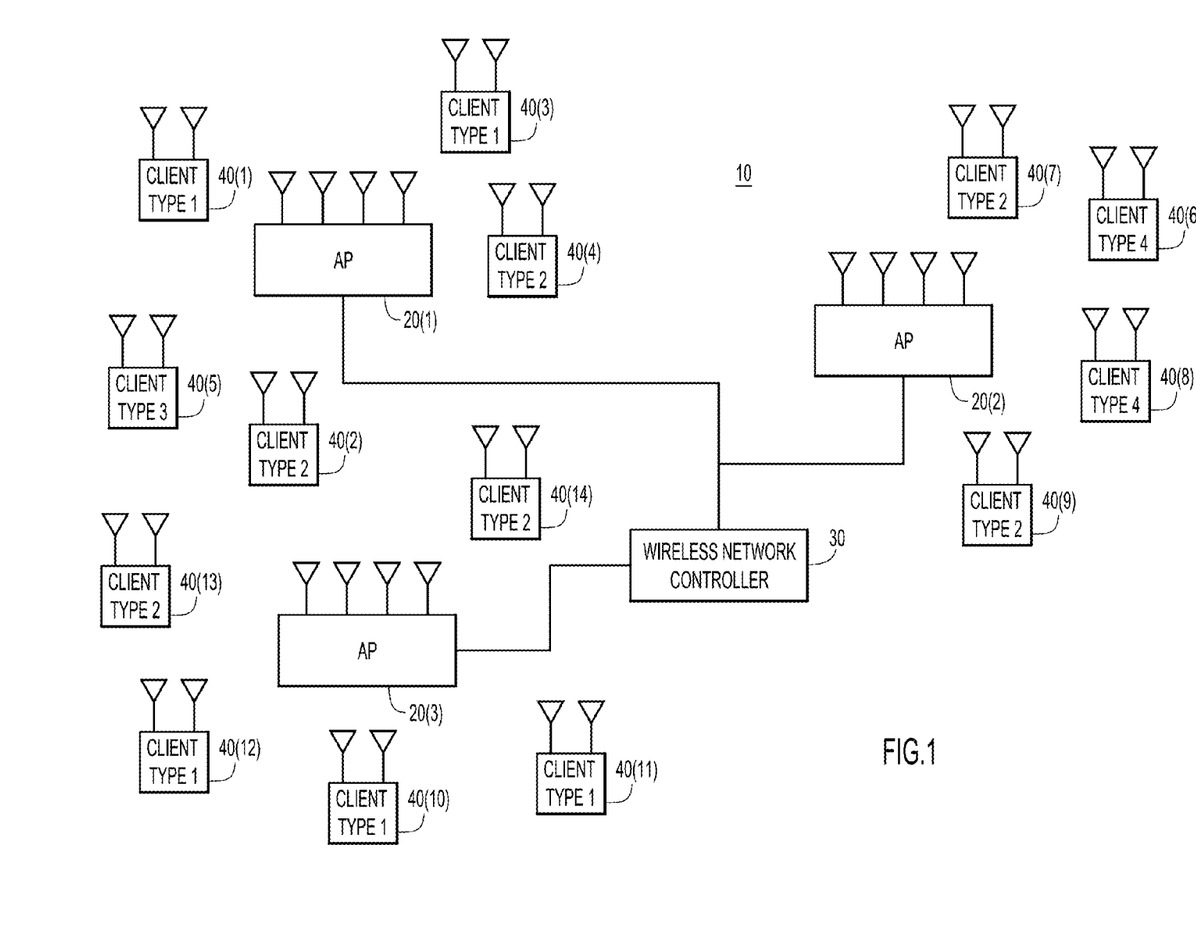
FIG. 1 is a diagram illustrating an example of a wireless network in which the hybrid contention techniques presented herein may be employed.

Referring to FIG. 1, a system diagram 10 is shown of a WLAN deployment in which several APs, e.g., APs 20(1), 20(2) and 20(3) are deployed, each serving different types of clients. For example, AP 20(1) serves clients 40(1)-40(5), some of which are of different types. For simplicity, there are four types of client devices that span the type examples described above, and are designated Type 1, Type 2, Type 3 and Type 4. AP 20(2) serves clients 40(6)-40(9) and AP 20(3) serves clients 40(10)-40(14). The types of each of the clients 40(1)-40(14) are labeled in FIG. 1. It should be emphasized that the number of clients shown in FIG. 1 is only an example and a real WLAN deployment may have numerous more clients. The APs 20(1)-20(3) are connected to a centralized controller, e.g., wireless network controller 30.

The example system shown in FIG. 1 illustrates a deployment where clients of similar types can be grouped together for assignment to a particular CP. For example, AP 20(1)

would group clients 40(1) and 40(3) together since they are both Type 1 clients, and would group clients 40(2) and 40(4) together since they are both Type 2 clients. AP 20(1) would assign clients 40(1) and 40(3) to the same CP which is different from the CP to which clients 40(2) and 40(4) would be assigned. AP 20(2) would group clients 40(7) and 40(9) together since they are both Type 2 clients, and assign these two clients to the same CP. Similarly, AP 20(2) would group clients 40(6) and 40(8) together since they are both Type 4 clients, and assign them to the same CP which is different from the CP to which clients 40(7) and 40(9) are assigned. AP 20(3) would group and assign clients in a similar manner.

Figure 2:
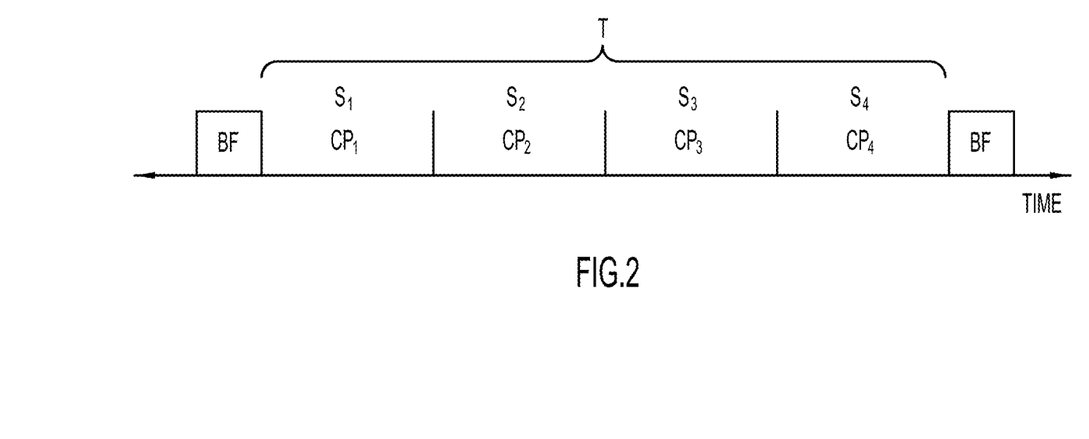
FIG. 2 is a timing diagram generally illustrating the partitioning of a time interval into multiple contention periods to which similar type clients are assigned to contend for access to the wireless medium.

Reference is now made to FIG. 2. FIG. 2 shows a time interval on a communication medium, e.g., a particular channel of a wireless medium. The time interval T is partitioned by an AP into several disjoint or overlapping CPs, denoted $CP_1$, $CP_2$, $CP_3$, and $CP_4$. The AP can change the number and length of a CP dynamically based on history of activity of clients. A group or set $S_i$ of clients is assigned to a corresponding CP, denoted $CP_i$. Clients that belong to a group or set $S_i$ can transmit during $CP_i$ and the AP can send downlink frames to clients in set $S_i$ during $CP_i$. The sets need not be disjoint as some clients may be part of more than one set.

The AP may assign clients to sets based on similarity of power requirements, throughput requirements, traffic type, etc. For example, all low power clients are assigned to a particular set and a corresponding CP, all high throughput clients are assigned to another particular set and corresponding CP, etc. The duration of each CP is determined by the AP based on the type of devices in each CP and the number of the devices.

In advance of the time interval T, the AP sends a Beacon Frame (BF) that contains information indicating the duration of the CPs, and assignment of clients to a particular CP. The AP would have grouped clients into sets in advance of sending the BF. The grouping and assignment to CPs can change at the beginning of each new time interval T, or if no BF is sent for the new time interval T, then previous assignments are used again, and the grouping and assignment to CPs is repeated/maintained until a BF is sent with new assignment information.

The AP can dynamically change assignment of clients to CPs based on their traffic and overall WLAN throughput. The AP may evaluate traffic load and transmission metrics defined for each CP and decide to make changes for purposes of load balancing within each CP, such as assigning a set of clients to more than one CP, and migrating a set of clients from one CP to one or more other CPs.

In a dense and diverse Basic Service Set (BSS), an AP has more control over devices and schedules their access so that delay-resistant devices (e.g., meters, sensors) are able to transmit at more deterministic periods with power-saving advantages. In a dense and diverse BSS, the AP can assign more time (longer or more frequent CPs) to devices with high-throughput traffic. As a result, several advantages are achieved, including reducing collisions in dense environments, reducing power consumption of the devices that are expected to remain on battery power for a long time, and prioritizing access to the medium by the type of the devices on top of the priority that the Enhanced Distributed Channel Access (EDCA) feature of IEEE 802.11e can offer.

Interaction with EDCA

The EDCA feature was designed to differentiate between various access categories. The hybrid contention techniques presented herein offer a differentiation across various types of clients to allow for more efficient power savings and less contention in dense environments. With hybrid contention, the EDCA mechanism still plays a role during (within) the CPs when a client is awake (receiver on and listening or transmitter on and transmitting). With hybrid contention, it is also possible to assign various access categories, of clients, to various CPs to further reduce the chance of contention and achieve a higher Quality of Service (QoS).

An example of such a use case is to assign more frequent or longer CPs to devices in a voice access category (AC_VO). Still referring to FIG. 2, in one example, sets $S_1$ and $S_3$ may contain clients that have voice traffic, and are assigned to $CP_1$ and $CP_3$, respectively. Sets $S_2$ and $S_4$ may contain clients that have other types of traffic, and are assigned to $CP_2$ and $CP_4$, respectively. Since a client might have voice traffic at one period of time but no voice traffic during a subsequent period of time, the announcement of the CP assignment is dynamic. Note that the duration of each CP is determined by AP and the type of devices, e.g. low throughput versus high throughput, and the number of devices and the duration need not be the same.

Figure 3:
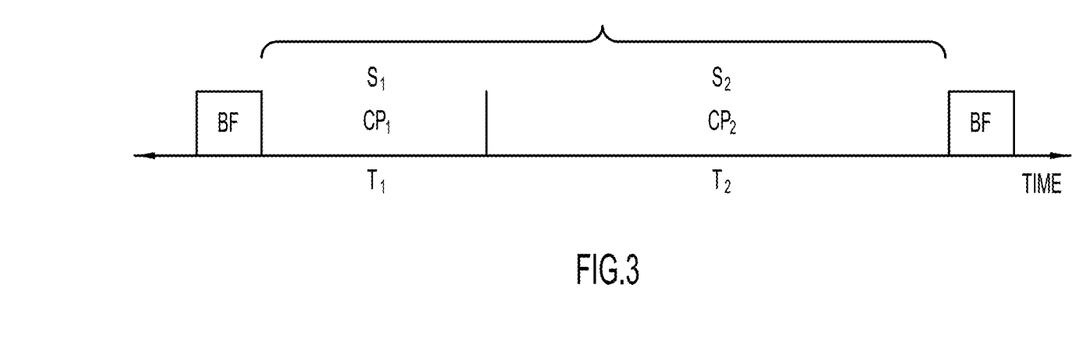
FIG. 3 is a timing diagram illustrating another example of partitioning a time interval according to the hybrid contention techniques presented herein.

FIG. 3 shows another example. In this example, clients are grouped into set $S_1$ (for $CP_1$), where set $S_1$ contains all clients identified as sensors, meters low-throughput clients, etc. Set $S_2$ (for $CP_2$) contains all other clients such as laptops, Smartphones, tablets, etc., that are not considered low-throughput devices. FIG. 3 shows that $CP_1$ is much shorter in duration than $CP_2$, which is acceptable for this grouping example. Thus, FIG. 3 represents an assignment scenario that is useful to assign relatively low throughput clients to a first contention period and assigning relatively high throughput devices to a second contention period.

Figure 4:
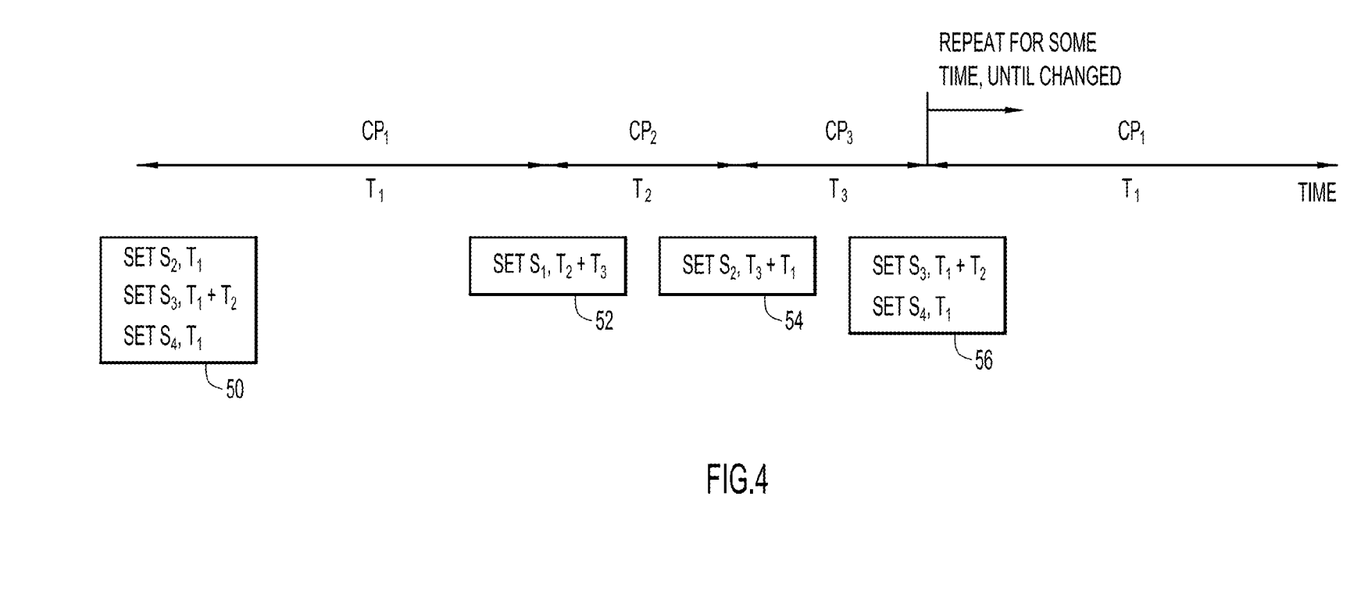
FIG. 4 is a timing diagram illustrating still another example of partitioning a time interval according to the hybrid contention techniques presented herein.

FIG. 4 illustrates still another example. In this example, there are three CPs: $CP_1$, $CP_2$, and $CP_3$, and 5 sets of clients (of similar types): $S_1$, $S_2$, $S_3$, $S_4$ and $S_5$. Instead of announcing in advance of a time period T, the AP announces at the beginning of each CP as shown at reference numerals 50, 52, 54 and 56. The announcement contains information indicating the clients that need not be awake (receiving or transmitting) during that CP, and the duration after which they may/shall wake up (depending on the type of device). As a result of above announcements:

Set $S_1$ clients are awake during $CP_1$, and asleep during $CP_2$ and $CP_3$

Set $S_2$ clients are awake during $CP_2$, and asleep during $CP_1$ and $CP_3$ (based on announcement 50 and subsequently announcement 54)

Set $S_3$ clients are awake during $CP_3$, and asleep during $CP_1$ and $CP_2$

Set $S_4$ clients are awake during $CP_2$ and $CP_3$, and asleep during $CP_1$

Set $S_5$ clients are always awake

Since in the example of FIG. 4, announcement messages are sent only to indicate that clients need not be awake, no announcement message is shown for set $S_5$ clients in FIG. 4. This is intentional because set $S_5$ clients are always awake during all CPs, as indicated above.

The announcement messages may be Beacon Frames containing the duration of CPs and the indication of the clients assigned to each CP. Updates to the assignment of a set of clients can be sent during the CP in which the relevant clients are awake.

Legacy Devices

Legacy devices that do not follow an AP's CP partitioning messages would communicate as they normally do without the hybrid contention. That is, legacy devices do not experience any difference. Since an AP cannot assign legacy devices to any of the scheduled CPs, the legacy devices would try to contend for the medium at any time, which could cause degradation to the delay or throughput that the AP has originally intended for a set of clients assigned to a CP. In the example of FIG. 4, clients in Set $S_5$ may be considered legacy devices since they are always awake and attempting to access the medium. Assuming that legacy devices would try to access the medium uniformly in time, the degradation is uniform across CPs. Depending on the percentage of the legacy devices, they might have minimal effect or they might add a constant load to each CP, decreasing the benefits that hybrid contention offers. However, there are still power-saving benefits for some client devices.

Interaction in Overlapping BSS Scenarios

Scheduling of CPs is determined by each AP independent of other APs. In Overlapping BSS (OBSS) scenarios, a scheduled CP of one BSS may overlap with one or more CPs of the other BSSs in the case of co-channel APs. If a controlling entity exists in the WLAN network (enterprise, shopping malls, etc.), such as the wireless network controller 30 shown in FIG. 1, then the controlling entity can manage CPs of the APs under its control, along with minimizing OBSS scenarios.

Figure 5:
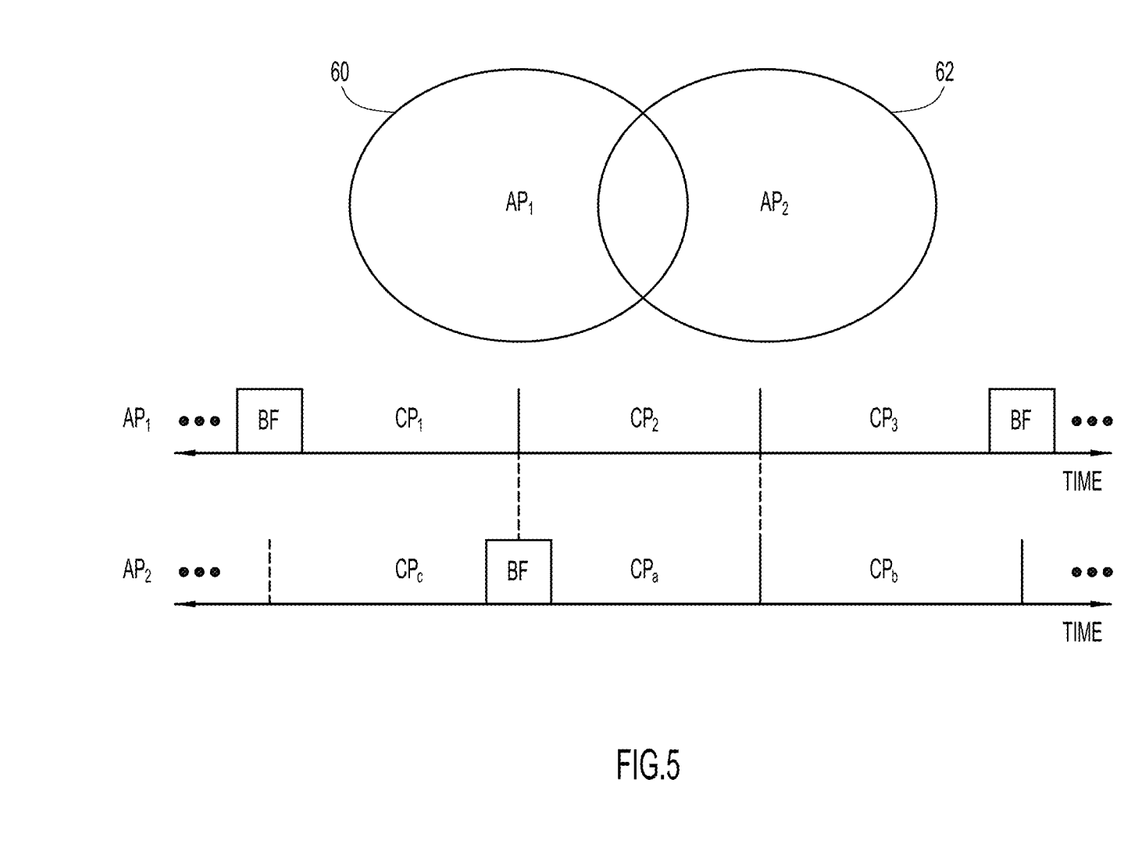
FIG. 5 is a diagram illustrating yet another example of partitioning a time interval when two access points have overlapping coverage areas.

However, in some cases a controlling entity may not exist and the co-channel APs need to learn about the scheduling of other APs and dynamically adjust their own scheduling. One solution is to have a mechanism that coarsely synchronizes APs and allows an exchange of the scheduling of CPs. Reference is now made to FIG. 5. FIG. 5 shows two overlapping BSSs associated with co-channel APs, $AP_1$ and $AP_2$. $AP_1$ has a coverage area shown at reference numeral 60 and $AP_2$ has a coverage area shown at 62. $AP_1$ and $AP_2$ coarsely synchronize to each other so they can assign a particular type of client device, e.g., low-throughput and low-power devices, to CPs that are approximately at the same time. For example, $AP_1$ would assign the clients it serves that are of this particular type to $CP_2$ and $AP_2$ would assign the clients it serves that are of the same particular type to $CP_a$, which as shown in FIG. 5, $CP_2$ and $CP_a$ are substantially aligned in time.

Another solution is for each AP to listen to the scheduling messages (announcements, e.g., Beacon Frames) of other OBSS APs and try to adjust its scheduling of CPs so as to align CPs with the CPs used for similar type of devices of the other overlapping AP. If an AP decides to schedule CPs regardless of the scheduling of other APs, each CP would see additional constant load, and depending on the number of OBSSs, the assigned devices to each CP may experience some degradation that the benefits of the hybrid contention mechanism offers.

Thus, to summarize the scenario depicted in FIG. 5, when there are at least first and second co-channel APs operating overlapping first and second BSSs, respectively, the first and second APs align in time contention periods in the first and second BSSs, to which similar (grouped) client devices are assigned. By similar, it is meant similar in terms of power requirements, throughput, and/or type. In addition, the first and second APs may receive announcement frames (containing information indicating the number and duration of contention periods for the respective first and second basic service sets) transmitted by each to their respective client devices, such that the first and second APs can align contention periods for similar client devices based on the information contained in the announcement frames.

Figure 6:
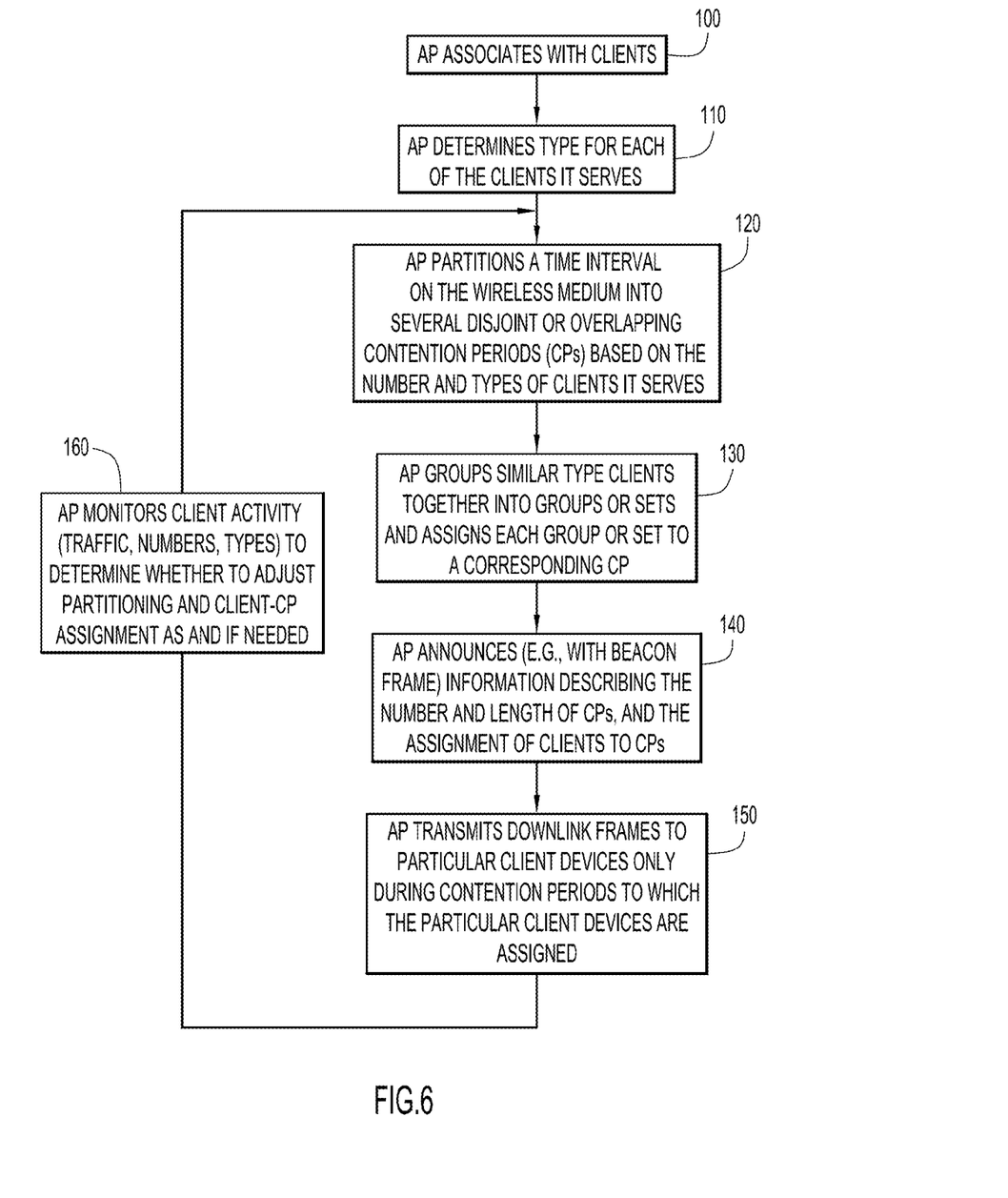
FIG. 6 is a flow chart generally depicting operations performed in an access point in accordance with the hybrid contention techniques presented herein.

Reference is now made to FIG. 6, which illustrates a flow chart depicting operations performed in an AP in accordance with the hybrid contention mechanism presented herein. At 100, clients associate to an AP through normal association processes, such as those of IEEE 802.11. This may happen on an ongoing basis as clients associate and roam between APs. At 110, the AP determines one or more of: power requirements and throughput requirements. The type of a device may reveal or indicate its power requirements (whether the device is low power, battery powered, not low power, duty cycle, etc.), and throughput requirements (i.e. low throughput versus high throughput). The AP can make this determination or identification from existing 802.11 frames (or newly defined frames) that the client sends at the time of association. The client includes information in these frames that reveals device type, and the device type in turn reveals the power requirements, throughput requirements, etc. Alternatively, it is possible that the AP can make a device type determination/identification based on a Media Access Control (MAC) address of the client. For example, a range of MAC addresses used for meters and sensor client devices does not overlap with a range of MAC addresses used for high-throughput client devices such as laptops and Smartphone, etc. In this way, the AP can distinguish client type based on a MAC address that the AP learns from a client when it associates to the AP. Further still, the AP might learn from past behavior of the client devices to categorize them as low or high throughput devices, and subsequently as a low power device. The AP may assign a device to one or more CP(s) and monitor activity of the device over time in order to gradually adjust the membership of the device to a more fitting CP.

At 120, the AP partitions a time interval on the wireless medium into several disjoint (non-overlapping) or overlapping contention periods (CPs) based on the number and types of clients it serves.

At 130, the AP groups clients together into groups or sets based on commonality of the second wireless devices in terms of one or more of: power requirements and throughput requirements, and assigns each group or set to a corresponding CP. The AP assigns each set of client devices to a corresponding one of the plurality of contention periods that only second wireless devices in each set contend for access to the wireless channel during the corresponding contention period assigned to that set.

At 140, the AP announces (e.g., with Beacon Frames) information describing the number and length of CPs, and the assignment of clients to CPs. As explained above, the announcement may involve transmitting, in advance of the overall time interval allocated for contention (e.g., time interval T in FIG. 2), a frame that announces to the client devices information indicating duration of the plurality of contention periods and assignment of respective client devices to the contention periods. As described above, the announcement frame may be transmitted in advance of each of a plurality of instances of the contention time interval (T) or only when changes are to be made for a time interval from a previous instance of the time interval. In another form, as depicted in FIG. 4, a different announcement frame may be transmitted in advance of each of a plurality of instances of the time interval T. In other words, the AP transmits, in advance of each contention period, an announcement frame that announces to the client devices information indicating duration of the contention period and which of the client devices are assigned to the contention period.

At 150, the AP transmits downlink frames to arbitrary particular client devices only during contention periods to which the particular client devices are assigned so that the particular client devices need not be awake and receiving signals during one or more contention periods to which the particular second wireless devices are not assigned.

At 160, and on an ongoing basis, the AP monitors client activity (traffic volume and traffic type, number of clients, types of clients, etc.) to adjust partitioning of CPs (number and duration of CPs) and client-CP assignment as and if needed. The adjustment of the number and duration of CPs and the assignment of client devices to CPs may be based on usage activity over time of the clients. The process then repeats at 120. It should be understood that within any of operations 110-160, an AP in an OBSS scenario may learn about the CP assignments of a neighboring AP and adjust its CP assignments as described above in connection with FIG. 5. That is, the AP may align in time a contention period for a first plurality of clients that it serves in a first BSS with a contention period of a second plurality of client devices served by another AP operating on a common channel in an overlapping second BSS.

Figure 7:
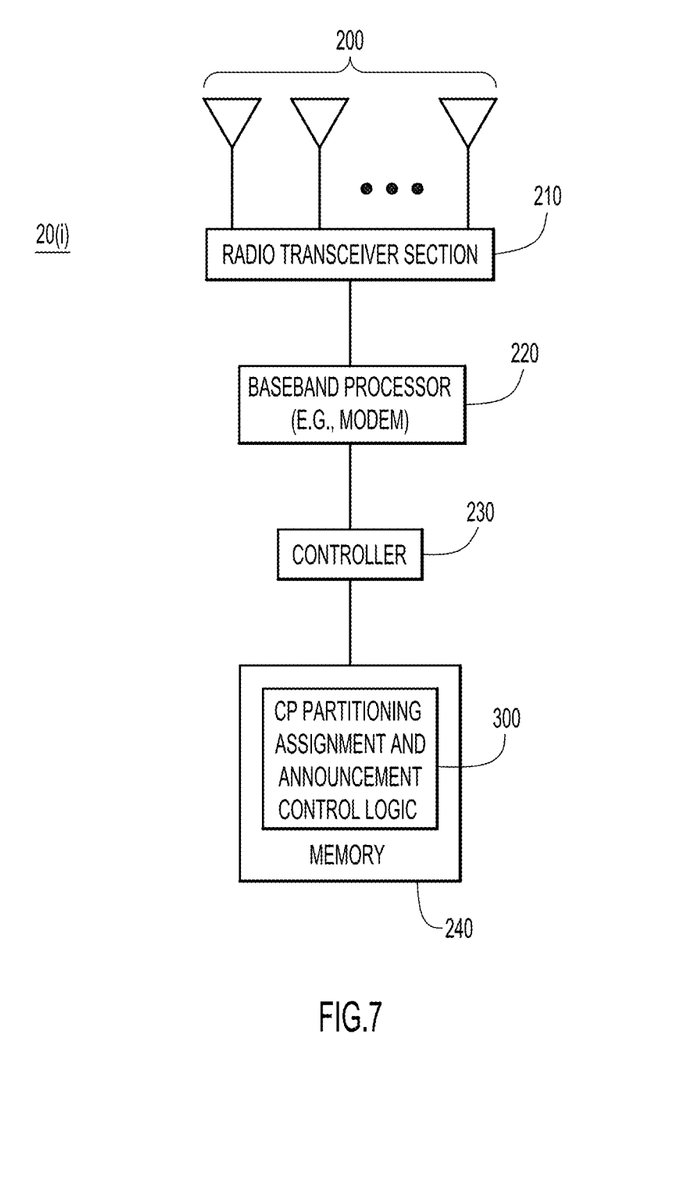
FIG. 7 is an example block diagram of an access point configured to perform the hybrid contention techniques presented herein.

Reference is now made to FIG. 7, which illustrates an example block diagram of an AP (shown generically at reference numeral 20(i)) configured to perform the hybrid contention mechanisms presented herein. The AP comprises one or more antennas 200, a radio transceiver section 210 (including one or more receivers and one or more transmitters) a baseband processor (e.g., a modem) 220, a controller 230 and a memory 240. The controller 230 controls various functions of the AP including the modem 220. To this end, executable instructions for CP Partitioning Assignment and Announcement Control Software/Logic 300 are stored/encoded in the memory 240. The controller 230 is, for example, a microprocessor or microcontroller, and executes the software 300 to perform the hybrid contention techniques described herein in connection with FIGS. 1-6. Alternatively, the operations of the software 300 may be embodied in hardware in the modem 220.

The memory 240 may comprise read only memory (ROM), random access memory (RAM), magnetic disk storage media devices, optical storage media devices, flash memory devices, electrical, optical, or other physical/tangible memory storage devices. In general, the memory 240 may comprise one or more tangible (non-transitory) computer readable storage media (e.g., a memory device) encoded with software comprising computer executable instructions and when the software is executed (by the controller 230) it is operable to perform the operations described herein.

To summarize, hybrid contention mechanisms are presented herein for controlling access to a wireless medium. An AP partitions a time interval on the wireless medium into several disjoint or overlapping contention periods based on the number and types of clients it serves. The AP groups similar type clients together into groups or sets and assigns each group or set to a corresponding contention period. The AP announces (e.g., with Beacon Frames) information describing the number and length of contention periods, and the assignment of clients to contention periods. On an ongoing basis, the AP monitors client activity (traffic volume and type, number of clients, types of clients, etc.) to determine whether to adjust partitioning and client-to-contention period assignment as and if needed.

The hybrid contention techniques presented herein are particularly useful when an AP handles many devices, numerous types of devices, and/or low-power sensor devices. These techniques provide an enhancement that can be employed within a current wireless standard specification (via introduction of a new management frame) or in a new wireless standard specification (e.g. IEEE 802.11ah). In short, these techniques provide new ways to partition wireless medium time to several contention periods, where in each period a subset of devices are allowed to contend.

Thus, in method form, a method is provided comprising: at a first wireless device that serves a plurality of second wireless devices in a wireless network, grouping the plurality of second wireless devices into sets based on commonality of the second wireless devices in terms of one or more of: power requirements and throughput requirements; partitioning a time interval on a wireless channel during which the second wireless devices may contend for usage of the wireless medium into a plurality of disjoint or overlapping contention periods; and assigning each set of second wireless devices to a corresponding one of the plurality of contention periods such that only second wireless devices in each set contend for access to the wireless channel during the corresponding contention period assigned to that set.

In apparatus form, an apparatus is provided comprising: An apparatus comprising: a radio transceiver configured to transmit and receive wireless signals to communicate with a plurality of wireless devices in a wireless network; a modem coupled to the radio transceiver and configured to perform baseband signal processing for transmit and receive signals; and a controller coupled to the modem. The controller is configured to: group the plurality of wireless devices into sets based on commonality of the second wireless devices in terms of one or more of: power requirements and throughput requirements; partition a time interval on a wireless channel during which the wireless devices may contend for usage of the wireless medium into a plurality of disjoint or overlapping contention periods; and assign each set of wireless devices to a corresponding one of the plurality of contention periods such that only wireless devices in each set contend for access to the wireless channel during the corresponding contention period assigned to that set.

In computer readable storage media form, one or more computer readable storage media encoded with software comprising computer executable instructions and when the software is executed operable to: in a first wireless device that serves a plurality of second wireless devices in a wireless network, group the plurality of second wireless devices into sets based on commonality of the second wireless devices in terms of one or more of: power requirements and throughput requirements; partition a time interval on a wireless channel during which the second wireless devices may contend for usage of the wireless medium into a plurality of disjoint or overlapping contention periods; and assigning each set of second wireless devices to a corresponding one of the plurality of contention periods such that only second wireless devices in each set contend for access to the wireless channel during the corresponding contention period assigned to that set.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising,
at a first wireless device that serves a plurality of second wireless devices in a wireless network, grouping the plurality of second wireless devices into sets based on commonality of the second wireless devices in terms of one or more of: power requirements and throughput requirements;

partitioning a time interval on a wireless channel during which the second wireless devices may contend for usage of wireless medium into a plurality of disjoint or overlapping contention periods;

assigning each set of second wireless devices to a corresponding one of the plurality of contention periods such that only second wireless devices in each set contend for access to the wireless channel during the corresponding contention period assigned to that set; and transmitting, in advance of the time interval, an announcement to the plurality of second wireless devices containing information indicating duration of the plurality of contention periods and assignment of respective second wireless devices to the contention periods.

2. The method of claim 1, further comprising the first wireless device transmitting downlink frames to particular second wireless devices only during contention periods to which the particular second wireless devices are assigned so that the particular second wireless devices need not be awake and receiving signals during one or more contention periods to which the particular second wireless devices are not assigned.

3. The method of claim 1, further comprising adjusting a number of the plurality of contention periods and duration of each contention period based on usage activity over time of the plurality of second wireless devices.

4. The method of claim 3, wherein adjusting further comprises changing assignment of second wireless devices to the sets based on usage activity over time of the plurality of second wireless devices.

5. The method of claim 1, wherein transmitting comprises transmitting the announcement in advance of each of a plurality of instances of the time interval or only when changes are to be made in the partitioning or assignment for a time interval from that of a previous instance of the time interval.

6. The method of claim 1, further comprising transmitting, in advance of each contention period, a frame that announces to the plurality of second wireless devices information indicating duration of the contention period and which of the plurality of second wireless devices are assigned to the contention period.

7. The method of claim 1, wherein assigning comprises assigning relatively low throughput second wireless devices to a first contention period, and assigning relatively high throughput second wireless devices to a second contention period.

8. The method of claim 1, wherein the first wireless device is a first access point and the plurality of second wireless devices correspond to a plurality of wireless client devices that are served by the first access point in a first basic service set, and wherein a second co-channel access point operates in proximity to the first access point and serves a plurality of wireless client devices in a second basic service set, the method further comprising the first access point and second access point aligning in time contention periods in the first and second basic service sets, respectively, to which similar wireless client devices are assigned.

9. The method of claim 8, further comprising the first and second access points receiving announcement frames transmitted by each to their respective wireless client devices, the announcement frames indicating the number and duration of contention periods for the respective first and second basic service sets, and wherein aligning is based on information contained in the announcement frames.

10. The method of claim 1, wherein the announcement is transmitted in a beacon frame.

11. An apparatus comprising:
a radio transceiver configured to transmit and receive wireless signals to communicate with a plurality of wireless devices in a wireless network;
a modem coupled to the radio transceiver and configured to perform baseband signal processing for transmit and receive signals; and
a controller coupled to the modem, and configured to:
    group the plurality of wireless devices into sets based on commonality of the second wireless devices in terms of one or more of: power requirements and throughput requirements;
    partition a time interval on a wireless channel during which the wireless devices may contend for usage of wireless medium into a plurality of disjoint or overlapping contention periods;
    assign each set of wireless devices to a corresponding one of the plurality of contention periods such that only wireless devices in each set contend for access to the wireless channel during the corresponding contention period assigned to that set; and
    generate, for transmission in advance of the time interval, an announcement to the plurality of wireless devices containing information indicating duration of the plurality of contention periods and assignment of respective wireless devices to the contention periods.

12. The apparatus of claim 11, wherein the controller is further configured to generate downlink frames for transmission to particular wireless devices only during contention periods to which the particular wireless devices are assigned so that the particular wireless devices need not be awake and receiving signals during one or more contention periods to which the particular wireless devices are not assigned.

13. The apparatus of claim 11, wherein the controller is configured to adjust a number of the plurality of contention periods and duration of each contention period based on usage activity over time of the plurality of wireless devices.

14. The apparatus of claim 11, wherein the controller is configured to assign relatively low throughput wireless devices to a first contention period and relatively high throughput clients to a second contention period.

15. The apparatus of claim 11, wherein the controller is configured to align in time a contention period for a first plurality of wireless devices served by the apparatus in a first basic service set with a contention period for a second plurality of wireless devices served by another apparatus operating on a common channel in a second basic service set.

16. The apparatus of claim 11, wherein the announcement is transmitted in a beacon frame.

17. One or more non-transitory computer readable storage media encoded with software comprising computer executable instructions and when the software is executed operable to:
in a first wireless device that serves a plurality of second wireless devices in a wireless network, group the plurality of second wireless devices into sets based on commonality of the second wireless devices in terms of one or more of: power requirements and throughput requirements;
partition a time interval on a wireless channel during which the second wireless devices may contend for usage of wireless medium into a plurality of disjoint or overlapping contention periods;
assign each set of second wireless devices to a corresponding one of the plurality of contention periods such that only second wireless devices in each set contend for access to the wireless channel during the corresponding contention period assigned to that set; and generate, for transmission in advance of the time interval, an announcement to the plurality of second wireless devices containing information indicating duration of the plurality of contention periods and assignment of respective second wireless devices to the contention periods.

18. The non-transitory computer readable storage media of claim 17, further comprising instructions operable to generate downlink frames for transmission to particular second wireless devices only during contention periods to which the particular second wireless devices are assigned so that the particular second wireless devices need not be awake and receiving signals during one or more contention periods to which the particular second wireless devices are not assigned.

19. The non-transitory computer readable storage media of claim 17, wherein the instructions operable to adjust comprise instructions operable to adjust a number of the plurality of contention periods and duration of each contention period based on usage activity over time of the plurality of second wireless devices.

20. The non-transitory computer readable storage media of claim 17, wherein the instructions operable to assign comprise instructions operable to assign relatively low throughput second wireless devices to a first contention period and relatively high throughput second wireless devices to a second contention period.

21. The non-transitory computer readable storage media of claim 17, further comprising instructions operable to align in time a contention period for a first plurality of second wireless devices served by the apparatus in a first basic service set with a contention period for a second plurality of second wireless devices served by another apparatus operating on a common channel in a second basic service set.

22. The non-transitory computer readable storage media of claim 17, wherein the announcement is transmitted in a beacon frame.

* * * * *